Feb. 17, 1959  F. J. FUCHS, JR  2,873,786
APPARATUS FOR MAKING ZERO-RADIUS
BENDS IN RECTANGULAR TUBING
Filed Feb. 26, 1954  4 Sheets-Sheet 1
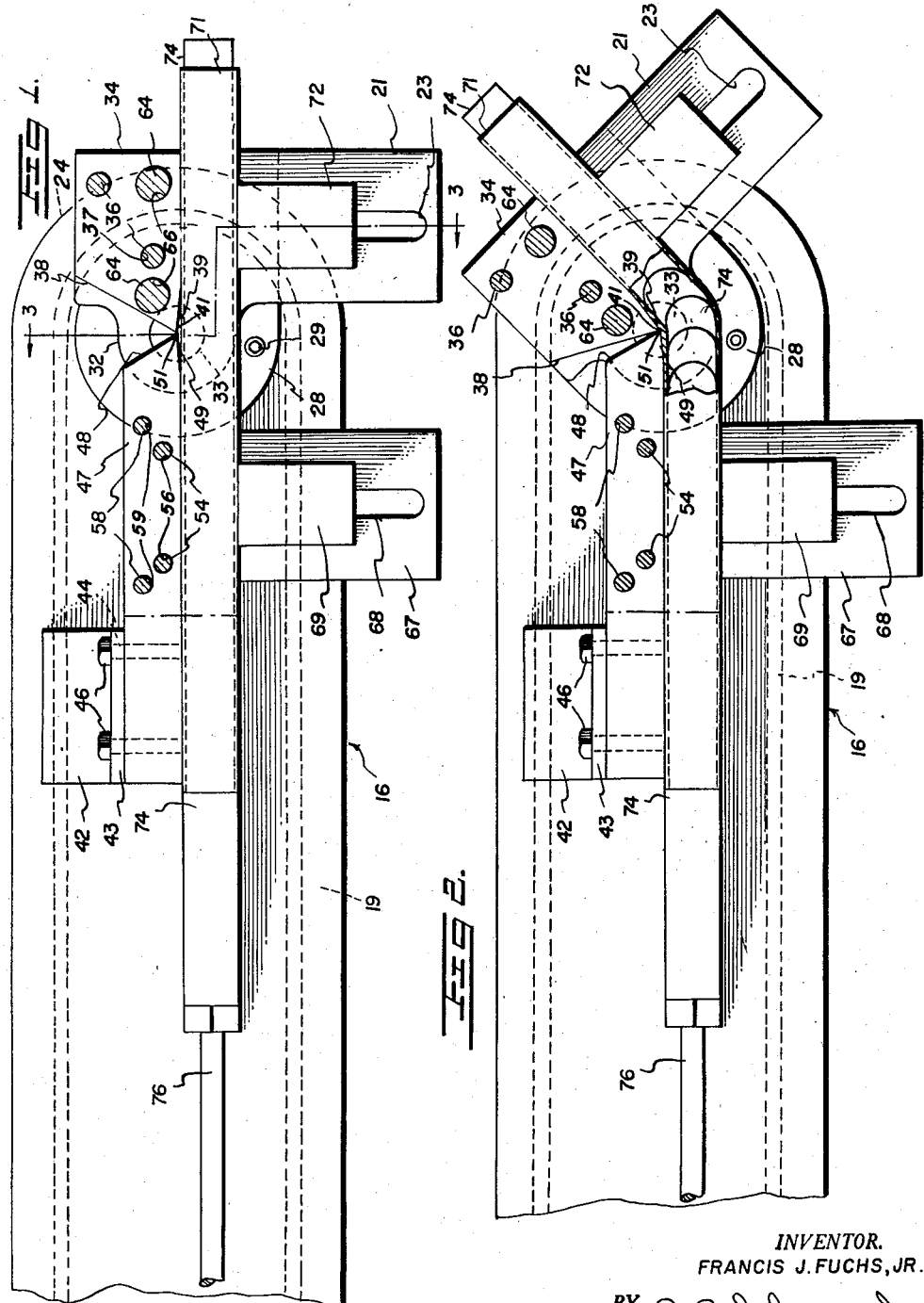
INVENTOR.
FRANCIS J. FUCHS, JR.
BY A. C. Schwarz, Jr.
ATTORNEY.

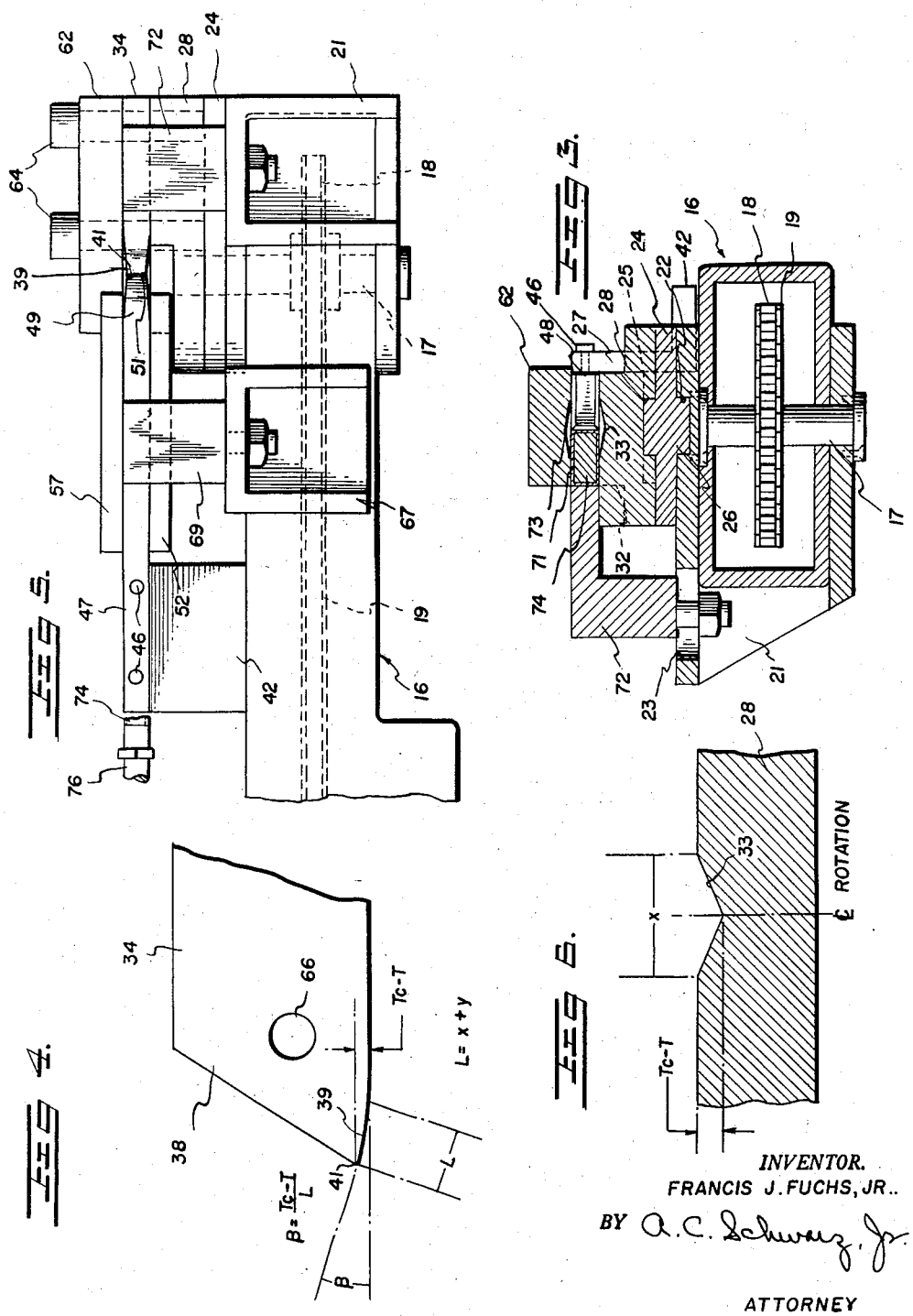

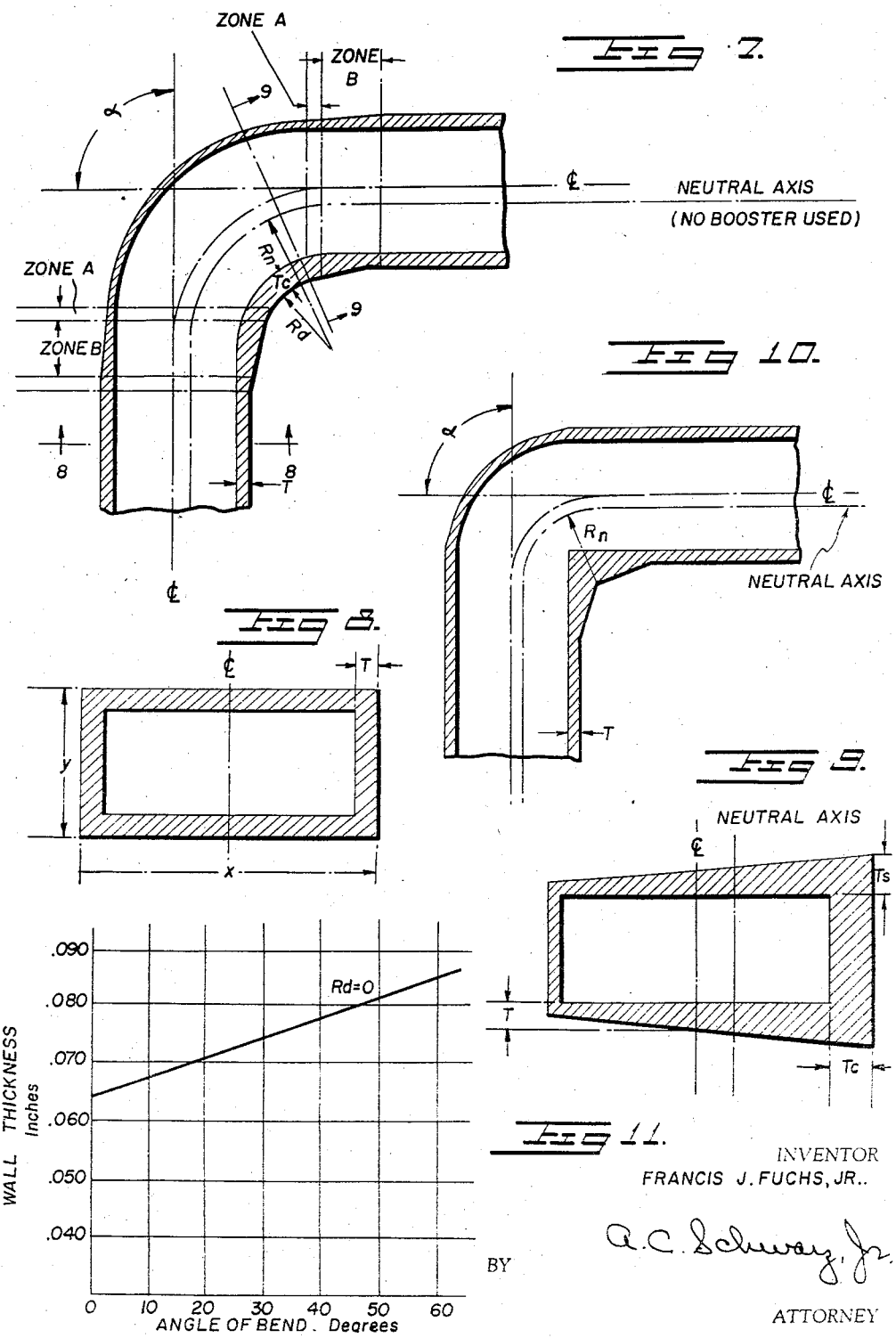

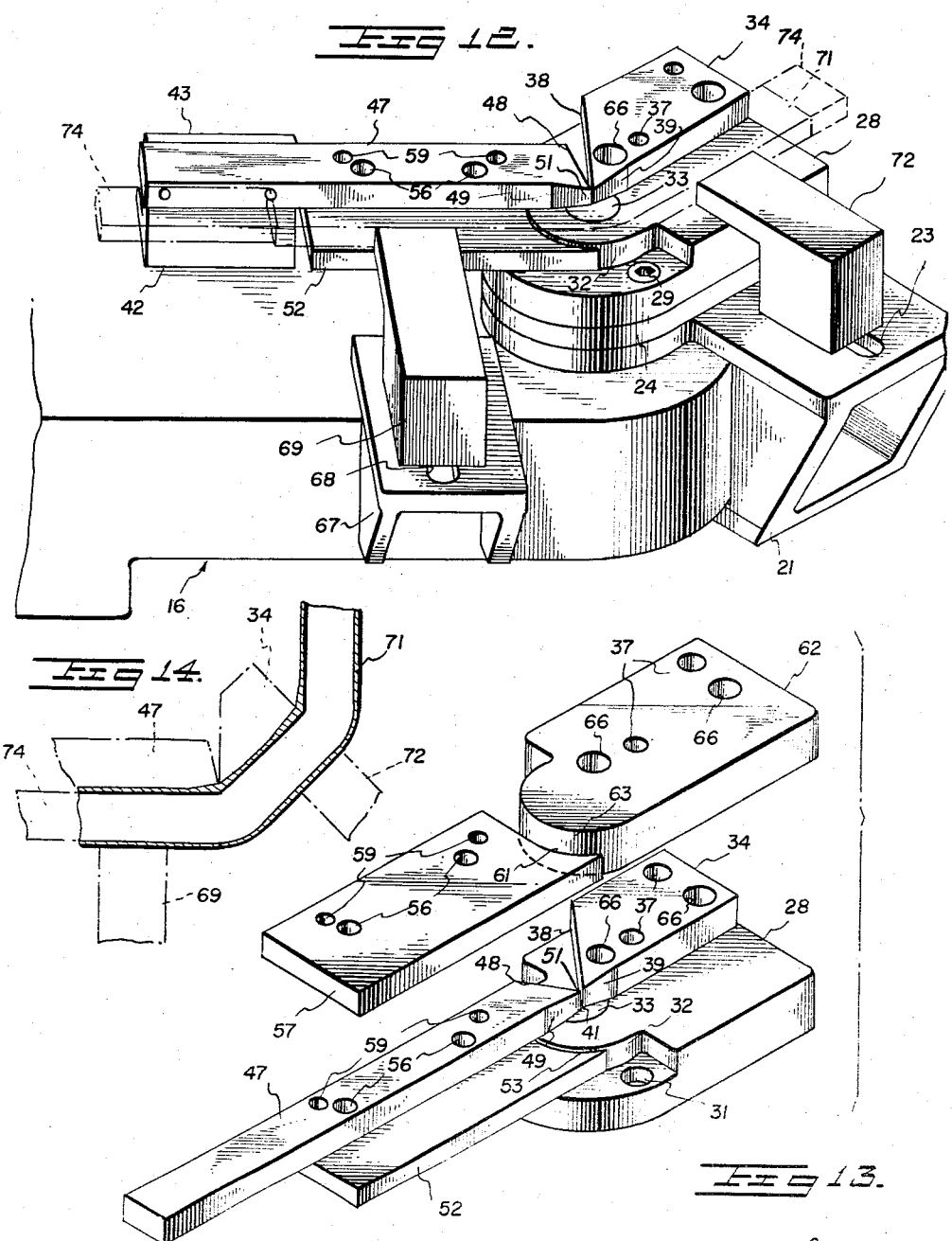

United States Patent Office 2,873,786
Patented Feb. 17, 1959

2,873,786

APPARATUS FOR MAKING ZERO-RADIUS BENDS IN RECTANGULAR TUBING

Francis J. Fuchs, Jr., Winston-Salem, N. C., assignor to Western Electric Company, Incorporated, New York, N. Y., a corporation of New York Application February 26, 1954, Serial No. 412,730

2 Claims. (Cl. 153—20)

This invention pertains broadly to methods and apparatus for making bends in tubing and more specifically to methods and apparatus for effecting angular or zero radius bends in rectangular tubing.

In the process known as draw bending it is common practice to provide apparatus whereby a tube to be bent is secured in engagement with a rotatable forming die about which the tube is bent when the forming die is rotated. In the course of effecting bends in rectangular tubing according to a process of the above nature, the inner wall of the tube, that is, the wall of the tube which is adjacent the forming die, is subjected to compressional forces which tend to increase the thickness of the inner wall. Conversely, the outer wall, that is, that wall of the tube which is opposite and parallel to the inner wall of the tube, is subjected to tensional forces which tend to stretch and decrease the thickness of the outer wall. Similarly, the top and bottom walls of a rectangular tube being bent are also subjected to compressional and tensional forces tending to change the thickness of these walls.

In certain applications of thin-walled metallic rectangular tubes, for example, as electrical wave guide elements, it is necessary that, during any bending of the tube, the interior dimensions of the tube be maintained substantially constant, for example, in order to prevent undesired alterations of the electrical transmission characteristics of the tube. In bending such tubes it is customary to support the interior of the tube with a flexible mandrel having substantially the same external configuration as the desired final internal shape of the tube. Such a mandrel prevents any inward distortion of the tube and consequently any flow of the metal in the tube walls must be outwardly.

In order to position the tube and thus force it into the desired shape about the forming die, it is necessary to support and guide the exterior of the tube, as by dies or clamps, adjacent the portions of the tube to be bent. In order to prevent excess wear or breakage of dies and mandrels and to prevent undue distortion of the tube caused by the outward flow of the metal of the tube walls, it has been found by the present inventor that it is necessary to properly contour such external dies, that is, to provide them with inclinations and/or concavities of predetermined sizes and locations for the reception therein of the metal of the tube walls which is displaced by the compressional forces of bending. Due to the large magnitude of the forces and the relatively small dimensions involved, it is necessary that the proper contours of the external dies be very accurately determined.

Accordingly, it is an object of the present invention to provide a method for accurately bending rectangular tubes while maintaining the internal dimensions of the tube substantially uniform.

It is also an object of the present invention to provide a method for predetermining the proper configurations of dies for accurately bending rectangular tubes.

A further object of the present invention is to provide an apparatus for accurately bending rectangular tubes while maintaining the internal dimensions of the tubes substantially uniform.

It is a still further object of the present invention to provide an apparatus for effecting angular or substantially zero radius bends in rectangular tubes while maintaining the internal dimensions of the tubes substantially uniform.

In accordance with the above objects, a preferred embodiment of the invention includes a base, a bending head rotatably mounted on the base, a forming die rigidly secured to the bending head and having an angular extremity terminating in a straight edge coincident with the axis of rotation of the bending head, a wiper die rigidly secured to the base and having one extremity thereof similar to the angular extremity of the forming die and located adjacent thereto. The forming die and the wiper die are provided with forming surfaces adjacent the angular extremities of the respective dies and which are provided with inclined portions of predetermined length and depth to permit the outward flow of metal from the compressed or inner wall of a tube being bent. Means are provided to position a tube in slidable engagement with the wiper die and the forming die. Top and bottom die blocks are also provided for retaining forward portions of the top and bottom walls of the tube in position during the bending process, said top and bottom die blocks being provided, adjacent the point of bend, with conical concavities of predetermined dimensions for reception therein of metal displaced from the top and bottom walls of the tube during the bending process. Upper and lower retaining plates are removably secured to the upper and lower surfaces resepectively of the wiper die to retain rearwardly extending portions of the top and bottom walls of the tube in position during the bending process. Means are also provided for supporting the interior of the tube and for actuating the bending head.

Other novel features and advantages of the present invention will become apparent by reference to the following detailed description when considered in conjunction with the following drawings, wherein:

Fig. 1 is a top plan view showing a tube in position in the bending apparatus prior to actuation thereof;

Fig. 2 is a view similar to Fig. 1 showing the bent tube in position after actuation of the bending apparatus;

Fig. 3 is a cross-sectional view of the bending apparatus taken on line 3—3 of Fig. 1 showing the top die block in position;

Fig. 4 is a fragmental top plan view of the forming die showing the inclined portion of the forming surface;

Fig. 5 is a front elevational view of the bending apparatus shown in Fig. 1 showing the top die block and the retaining plates in position;

Fig. 6 is a fragmental cross-sectional elevation of the bottom die block showing the conical cavity therein;

Fig. 7 is a longitudinal cross-sectional view of a rectangular tube which has been bent in the form of a smooth curve;

Fig. 8 is a lateral cross-sectional view of an unbent portion of a tube taken on line 8—8 of Fig. 7;

Fig. 9 is a lateral cross-sectional view of a bent portion of a tube taken on line 9—9 of Fig. 7;

Fig. 10 is a longitudinal cross-sectional view of a rectangular tube which has been subjected to an angular or zero radius bend;

Fig. 11 is a graph relating the thickness of the inner or compressed wall of a rectangular tube to the angle through which the tube is bent for an angular or zero radius bend;

Fig. 12 is a perspective view of a portion of the bending apparatus showing a tube in position in the apparatus after actuation thereof;

Fig. 13 is a partially exploded perspective view of a part of the bending apparatus; and Fig. 14 is a schematic top plan view of a portion of the bending apparatus and shows, in cross section, a tube after having been subjected to a multiple bending process.

Attention is first directed to Figs. 7, 8 and 9 which show a section of rectangular tubing which has been bent in the form of a smooth curve. As shown in Fig. 7, and as disclosed in co-pending application of Francis J. Fuchs, Jr., Serial No. 262,247, filed December 18, 1951, now patent 2,792,048, granted May 14, 1957, a hypothetical dividing line may be drawn along the length of a tube subjected to a draw bending process in such a position that no net compressional or tensional forces exist along the line. Such a line is termed the "neutral axis" of the tube and is of interest as indicative of the magnitude and location of the bending forces which are applied to a tube of particular characteristics when being bent in a particular bending apparatus. Reference to Fig. 7 will show that, if any increase in thickness of the top and bottom walls of the tube be disregarded, the volume of the metal in the inner or compressed wall of the tube, in the arcuate length thereof which is subjected to the bending process, remains constant. It then becomes evident that the thickness of the bent inner wall may be determined by equating the volume of metal in the bent or arcuate length of the inner wall, expressed in terms of the thickness of the bent inner wall, to the volume of metal in the unbent or straight inner wall, expressed in terms of the thickness of the unbent wall. Thus:

$$T 2\pi R_n(\alpha/360)y = T_c 2\pi (R_d + T/2)(\alpha/360)y$$

or $$T_c = T \frac{2\pi R_n(\alpha/360)}{2\pi (R_d + T/2)(\alpha/360)} \quad \text{Equation (I)}$$

where $\alpha$ = the angle of the bend;
$R_n$ = the radius of the neutral axis of the tube;
$R_d$ = the radius of the bend;
$T_c$ = the thickness of the bent inner wall of the tube; and
$T$ = the thickness of the unbent wall of the tube.

The term $T/2$ is relatively insignificant and may be dropped. Thus:

$$T_c = T \frac{2\pi R_n(\alpha/360)}{2\pi R_d(\alpha/360)} \quad \text{Equation (II)}$$

Thus the thickness of the inner wall is increased in direct proportion to the ratio of the arc length of the neutral axis to the arc length of the bent inner wall of the tube.

It will be seen from reference to Fig. 7 that the compressed and thickened portion of the inner wall tapers gradually into the uncompressed portion of the inner wall through zones designated as "zone A" and "zone B." The sum of the lengths of zone A and zone B has been experimentally determined by the inventor to have a value approximately equal to 1.5 times the sum of the smaller ($y$) and the larger ($x$) cross-sectional dimensions of the unbent tube (Fig. 8). For bends of relatively small radius, for example less than ⅜ inch, zones A and B become of great importance in the calculation of the wall thickness of the compressed inner wall because the arc length of the bent inner wall $(2\pi R_d)(\alpha/360)$ is very small and a large proportion of the displaced metal flows into the compressed wall flows into the zones A and B (Fig. 10) thereby rendering inaccurate the determination of the value of $T_c$ by Equation II. In such instances, it has been found possible to consider the zones A and B as extensions of the arc length of the bent inner wall of the tube. Because zones A and B are of variable thickness, they must be considered as having an average thickness and hence equivalent to a shorter empirical length L which may be added to Equation II. Thus:

$$T_c = T \frac{2\pi R_n(\alpha/360) + L}{2\pi R_d(\alpha/360) + L} \quad \text{Equation (III)}$$

where $R_d$ is less than ⅜ inch.

It has been determined experimentally that the value of L is approximately equal to the sum of the cross-sectional dimensions of the unbent tube $x+y$.

Where the tube is bent to a zero radius (Fig. 10), that is where $R_d=0$, Equation III reduces to $$T_c = T \frac{2\pi R_n(\alpha/360) + L}{L} \quad \text{Equation (IV)}$$

It has also been found that for a zero radius bend the increase in the thickness of the top and bottom walls of the tube is approximately equal to the increase in thickness of the compressed wall, that is $T_s = T_c$ (Fig. 9).

As an example of the use of the above equations, let it be assumed that it is desired to bend, in the plane of the larger cross-sectional dimension, a rectangular tube having external dimensions of ⅝ inch by 1¼ inches and having a wall thickness of 0.064 inch. The tube is to be bent on a zero radius and through an angle of 45 degrees. In this example:

$L = x+y = 1.250+0.625 = 1.875$ inches;
$\alpha = 45$ degrees;
$T = 0.064$ inch;
$R_d = 0$; and
$R_n = 1.250/2 = 0.625$ inch.

The value of $R_n$ is based on an assumption that the neutral axis is coincident with the center line of the tube. This is approximately correct if a booster is used, such as is disclosed in co-pending application of Francis J. Fuchs, Jr., Serial No. 355,137, filed May 14, 1953, now Patent 2,837,137, granted June 3, 1958. It has been found that if no booster is used, the neutral axis is spaced from the inner wall of the tube by an amount equal to approximately 30 to 40 percent of the width ($x$) of the unbent tube.

Then substituting in Equation IV:

$$T_c = 0.064 \frac{2\pi \times 0.625(45/360) + 1.875}{1.875}$$

or $$T_c = 0.081 \text{ inch}$$

The procedure followed in the above example may be repeated for various values of the angle $\alpha$ and the values of $T_c$ thereby obtained may be plotted against the angle $\alpha$ to give a relationship as shown in Fig. 11. Experimentally determined values of the wall thickness $T_c$ for representative angles of bend have been determined and checked against the graph of Fig. 11 and show good correlation with the theoretical values. In the example above, the value of the wall thickness $T_s$ of the top and bottom walls of the bent tube is approximately equal to the value of $T_c$. That is, $T_s = 0.081$ inch.

Attention is now directed to Figs. 1 and 3 which show the preferred embodiment of the present invention in the form of an apparatus for effecting angular or zero radius bends in rectangular tubing. The numeral 16 designates generally a bending machine having a vertically positioned shaft 17 rotatably mounted thereon. Shaft 17 is provided with a sprocket wheel 18 for engagement with a sprocket chain 19. Chain 19 is actuated by suitable means such as a double-acting hydraulically operated piston (not shown). A bending head 21 is rigidly secured to the shaft 17 and is rotatable therewith. The upper surface of the bending head 21 is provided with a slot 22 and with a slideway 23. A base plate 24 is provided on the lower surface thereof with a raised boss 26 and on the upper surface thereof with a projecting key 27. The base plate 24 is positioned upon the bending head 21 by inserting the boss 26 in the slot 22, and the base plate 24 is then rigidly secured to the bending head 21 by suitable means. A bottom die block 28 is provided with a key slot 25 corresponding to the key 27 for positioning the bottom die block 28 on the base plate 24 to which the die block 28 is then rigidly secured by suitable means such as bolts 29 and apertures 31. One extremity of the bottom die block 28 is in the form of a semicircular surface and an adjacent portion of the bottom die block 28 is cut away to form a projecting convex semicircular shoulder 32. The radial center of curvature of the shoulder 32 is located coincidently with the axis of rotation of the bending head 21. The upper surface of the bottom die block 28 is provided with a conical depression 33 (Fig. 6) having its apex at the radial center of curvature of the shoulder 32.

A forming die 34 is rigidly secured to the upper surface of the bottom die block 28 by means of pins 36 and apertures 37. One extremity of the forming die 34 is provided with a plane angularly disposed surface 38 and with a plane inclined surface 39 (Fig. 4). The angularly disposed surface 38 and the inclined surface 39 intersect in a vertical straight edge or corner 41 which is located coincidentally with the axis of rotation of the bending head.

A supporting block 42 is rigidly mounted upon the bending machine 16 and is provided with a flange 43 having apertures 44 by means of which, together with bolts 46, a wiper die 47 is secured in such a manner that one extremity thereof is located adjacent the forming die 34. The wiper die 47 is provided on the one extremity thereof with a plane angularly disposed surface 48 and a plane inclined surface 49. The angularly disposed surface 48 and the inclined surface 49 intersect in a vertical straight edge or corner 51 which is located adjacent the vertical straight edge or corner 41 of the forming die 34 and is substantially coincident with the axis of rotation of the bending head.

A lower retaining plate 52, having one extremity thereof in the form of a concave semicircular shoulder 53 for rotatable sliding engagement with the convex semicircular shoulder 32, is secured to the lower surface of the wiper die 47 by means of pins 54 and apertures 56. A similarly shaped upper retaining plate 57 is secured to the wiper die 47 by means of bolts 58 and apertures 59 and is provided on one extremity thereof with a concave surface 61.

A top die block 62 is provided on one extremity thereof with a convex semicircular surface 63 similar to the convex semicircular shoulder 32 and alignable therewith when the top die block 62 is rigidly secured to the forming die 34 by means of bolts 64 and apertures 66, in which position of the upper die block 62 the convex surface 63 thereof is in rotatable sliding engagement with the concave surface 61 on the upper retaining plate 57.

The lower surface of the top die block 62 is provided with a conical depression 73 (Fig. 3) corresponding in configuration to the conical depression 33 on the bottom die block 28 and vertically alignable therewith when the top die block 62 is mounted upon the forming die 34.

A pressure die support 67 is mounted upon the bending machine 16 and is provided on the upper surface thereof with a slideway 68 in which is slidably mounted a pressure die 69. The pressure die 69 is adapted to engage a rearwardly extending portion of a tube 71 when the tube is positioned within the bending apparatus with one wall thereof in engagement with the wiper die 47 and the forming die 34 (Fig. 1). A clamping die 72 is slidably mounted in the slideway 23 on the bending head 21 and is adapted to engage a forwardly extending portion of the positioned tube 71.

A suitable flexible mandrel 74, such as is disclosed in co-pending application of Francis J. Fuchs, Jr., and George Nevrincean, Serial No. 412,708, filed February 26, 1954, is connected at one extremity thereof to a reciprocable mandrel shaft 76 and is adapted for slidable insertion into the tube from the rearward extremity of the positioned tube 71.

The inclined surfaces 39 and 49 on the forming die 34 and the wiper die 47, respectively, and the conical depressions 33 and 73 on the lower die block 28 and the upper die block 62, respectively, define concavities for the reception therein of the metal of the tubing walls which is displaced during the bending operation. The configurations of these concavities are accurately determinable by means of the equations set forth above.

For example, let it be assumed that the illustrated apparatus is to be used to effect a zero radius bend of 45 degrees in a rectangular tube having external dimensions of ⅝ inch by 1¼ inches and a wall thickness of 0.064 inch. The final wall thickness $T_c$ of a tube having these characteristics and bent in this manner was found in the example given above to be 0.081 inch. In the preceding example it was also shown that the length L is equal to the sum of the external dimensions of the tube $x+y=1.875$ inches. Therefore the maximum depth of the concavities on the forming die 34 and the wiper die 47, defined by the inclined surfaces 39 and 49, respectively, is equal to $0.081-0.064=0.017$ inch, and the length of each of the inclined surfaces 39 and 49 is equal to 1.875 inches. Similarly, as was pointed out in the preceding example, the final maximum thickness $T_s$ of the top and bottom walls of the tube, for a zero radius bend, is approximately equal to the final thickness $T_s$ of the inner or compressed wall of the tube. Therefore, the maximum depth of the conical depressions 33 and 73 is also equal to 0.017 inch. If it be assumed, as in the preceding example, that the neutral axis of the tube is coincident with the center line thereof, then the increase in thickness of the bent portions of the top and the bottom walls of the tube will extend over one half of the width of the tube, that is, over a width of .625 inch. Therefore the diameters of the conical depressions 33 and 73 will be equal to $2 \times 0.625$ inch or 1.250 inches.

The configuration of the inclined surfaces 39 and 49 may also be expressed in terms of the angle of inclination of the inclined surfaces 39 and 49 relative to the plane surface of the forming die 34 which is adjacent the positioned tube 71. Thus:

$$\sin \beta = \frac{T_c - T}{L}$$

where $\beta$ = the angle of inclination.

The operation of the above apparatus will now be described.

The tube 71 is placed with an inner or one wall thereof to be angularly bent in engagement with the wiper die 47 and the forming die 34 while the latter is in an unactuated position (Fig. 1). The top die block 62 is then secured to the forming die 34 by means of bolts 64, and the upper retaining plate 57 is secured to the wiper die by means of bolts 58. The pressure die 69 and the clamping die 72 are then moved into engagement with the opposite or outer wall of the tube 71. The mandrel shaft 76 is actuated to feed the flexible mandrel 74 into the rearward extremity of the tube 71 and forwardly to a position where its forward end portion will support the tube at the region of bend. The bending head 21 is then actuated through a predetermined angle, for example, 45 degrees (Fig. 2), whereby the inner wall of the tube 71 is bent in the form of a sharp angle about the corners 41 and 51 of the forming die 34 and the wiper die 47, respectively. It is this sharp angular bend, as opposed to a smooth curve, which is called a "zero radius" bend. The displaced metal in the inner one wall of the tube flows outwardly into the concavities defined by the top and bottom die blocks and by the inclined surfaces 39 and 49 on the forming die 34 and the wiper die 47, respectively. Similarly, metal in the top and bottom walls of the tube 71 flow outwardly into the conical depressions 73 and 33 in the top die block 62 and the bottom die block 28, respectively.

In practice, in order to allow for an inherent resilient spring-back of the bent tube 71 after the release of the bending forces, the bending head 21 may be rotated through an angle slightly greater than the desired final angular configuration of the tube, which angle may be predetermined.

At the completion of the bending operation, the mandrel 74 may be removed from the tube, the upper die block 62 removed from the forming die 34, the upper retaining plate 57 removed from the wiper die 47, the pressure die 69 and the clamping die 72 disengaged from the tube 71 and the tube removed from the bending apparatus.

If desired, a tube, after being subjected to the operation described above, may, with a suitable mandrel such as is disclosed in the third of the aforementioned co-pending applications, be reintroduced into the bending apparatus and another angular bend effected therein (Fig. 14).

It is to be understood that the preferred embodiment described and shown herein is merely illustrative of the present invention and that numerous additions or modifications may be made thereto without departing from the spirit and scope thereof.

What is claimed is:

1. Apparatus for bending a normally straight rectangular tube which comprises a base, a rotatable bending head mounted on said base, a bottom die secured to said head, a forming die secured to said bottom die and having a flat portion to engage a side of said tube and an end portion diverging from the plane of said flat portion to form with said side of said tube a recess to receive material displaced during a bending operation, a wiper die secured to said base and having a flat portion to engage said side of said tube and an end portion diverging from the plane of said flat portion to form with said side of said tube a recess to receive material displaced during the bending operation, a pressure die mounted on said base to hold a rearward portion of the tube slidably against the flat portion of said wiper die, a clamping die mounted on said head to hold a forward portion of said tube to be bent slidably against the flat portion of said forming die, a top die removably mounted on said forming die, said top and bottom dies having portions engaging the top and bottom of said tube and portions forming with said tube concavities, said recesses and concavities being of predetermined volumes equal to the respective volumes of material of said top, bottom, and side walls displaced by compression during the bending operation about the adjacent ends of said forming and wiper dies, flexible mandrel means for supporting the interior of said tube during the bending thereof and maintaining the internal cross-sectional dimensions of the tube substantially constant, and means to rotate said head whereby said tube is bent to a zero radius about the inner side of side wall.

2. Apparatus according to claim 1 in which the angle of divergence B of said diverging end portions of said forming and wiper dies is determined by the formula $$\sin B = \frac{T_c - T}{L}$$

where $$T_c = \frac{T 2\pi R_n (\alpha/360) + L}{L}$$

and in which the maximum depth of said concavities in said top and bottom dies is determined by the formula $T_c - T$, where $$T_c = \frac{T 2\pi R_n (\alpha/360) + L}{L}$$

References Cited in the file of this patent

UNITED STATES PATENTS

| 347,488 | Hunsicker | Aug. 17, 1886 |
| 620,227 | Condon | Feb. 28, 1899 |
| 709,282 | Vollmer | Sept. 16, 1902 |
| 951,717 | Andres | Mar. 8, 1910 |
| 973,401 | Bailey | Oct. 18, 1910 |
| 1,714,083 | Frank | May 21, 1929 |
| 2,044,322 | Oliver | June 16, 1936 |
| 2,057,916 | Quartz | Oct. 20, 1936 |
| 2,094,303 | Rowell | Sept. 28, 1937 |

FOREIGN PATENTS

| 5,019 | Great Britain | Apr. 23, 1885 |
| 18,896 | Great Britain | 1903 |